Figure 1:
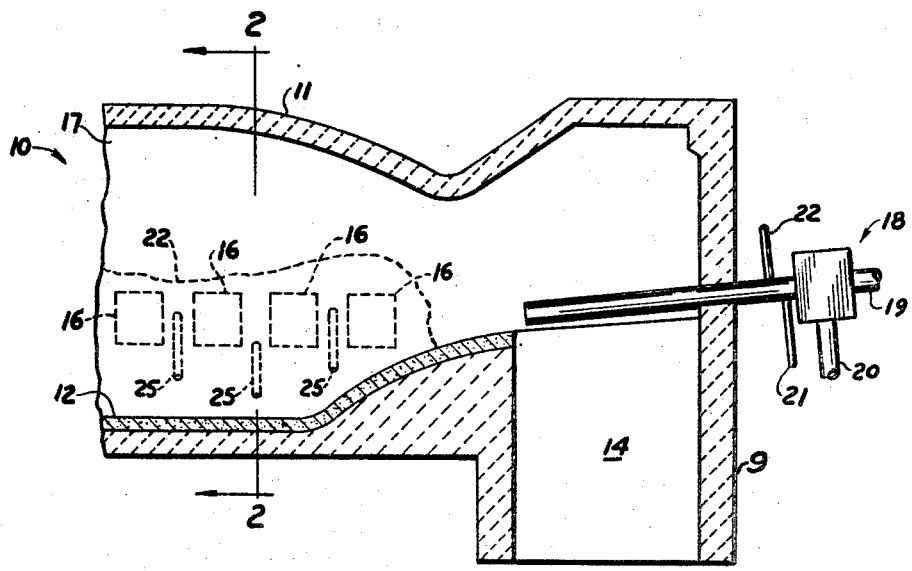

March 9, 1954 W. W. KOMPART 2,671,724
HEATING SCRAP IN OPEN HEARTH FURNACES
Filed May 5, 1952

INVENTOR.
WALTER W. KOMPART
BY
ATTORNEY.

Patented Mar. 9, 1954

2,671,724

UNITED STATES PATENT OFFICE 2,671,724

HEATING SCRAP IN OPEN HEARTH FURNACES

Walter W. Kompart, Steubenville, Ohio, assignor to National Steel Corporation, a corporation of Delaware Application May 5, 1952, Serial No. 286,061

6 Claims. (Cl. 75—43)

This invention relates to improvements in the method of making steel in open hearth furnaces and more particularly relates to the heating of the scrap charge in an open hearth furnace.

This application is a continuation-in-part of my copending application, Serial No. 86,226, filed April 8, 1949, now abandoned.

In the production of steel in the open hearth furnace, cold scrap metal is charged into the furnace and heating flames are directed into the furnace. During the first stage of the steel making operation, the scrap metal is heated and then melted. After the scrap metal has been heated and melted, molten pig iron is charged into the furnace. The bath of molten metal is then refined during the second stage of operation, after which the molten metal—steel—is discharged from the furnace.

The period required for heating the cold scrap metal is quite lengthy as it takes a long time for the heat from the flames in the upper portion of the furnace to soak down through the pile of scrap metal. Various attempts have been made to reduce the time required to heat the scrap and thereby increase the amount of steel produced per day per furnace. One expedient has been the use of oxygen or oxygen-rich gas as the combustion-supporting gas for the fuel. This use of oxygen increases the temperature of the flames and the temperature in the furnace above the charge but does not cause the flames or hot gases to penetrate into the pile of scrap. While this increase in temperature reduces the period required for the heat to soak through from the upper surface to the interior of the scrap charge, the period remains quite lengthy and lasts for a number of hours because heat soaks through the scrap charge very slowly.

Accordingly, it is an object of the present invention to provide an improved method of more rapidly heating and melting the scrap charge in an open hearth furnace.

Another object of the present invention is to increase the rate of heat penetration throughout the pile of scrap metal in an open hearth furnace and thereby reduce the time required for the first stage of the steel making operation.

In accordance with the present invention, the period required to heat the scrap metal charge in the open hearth furnace is reduced by flooding the interstices between the pieces of scrap metal with oxygen or an oxygen-rich gas. While this invention is not limited to any particular theory, it is believed that the oxygen replaces the gaseous products of combustion or other gases trapped in these interstices so that the interstices are filled with a combustion-supporting gas. Unburned fuel or incompletely burned gases from the flames tend to penetrate the pile of scrap and burn in these interstices to more rapidly heat the pieces of cold metal, particularly the interior pieces of metal. The usual gaseous products of combustion which are trapped in the voids in the scrap pile prevent combustion within the pile and block the travel of the heating flames into the pile so that most of the heat must soak through the large mass of metal. In addition, when the scrap metal has become heated to the ignition temperature and particularly when the scrap metal starts to melt, the oxygen will unite with the hot scrap metal to generate additional heat within the pile. The uniting of the oxygen with combustible gas in the interstices to effect combustion in these voids reduces the first portion of the heating period during which at least part of the cold scrap metal is heated to the ignition temperature by generating heat within the pile of scrap metal which reduces the amount of heat which must soak through the pile of metal from the outer surface. This action plus the heat generated by oxidation of scrap metal after the scrap metal has been heated to the ignition temperature reduces the second portion of the heating period during which the scrap metal is heated above the ignition temperature and melted.

While cold ferrous metal will oxidize to a relatively very limited extent over a relatively long period in the presence of an oxygen rich gas, the rate of oxidation is very slow as compared to the rate of oxidation when the metal is at the ignition temperature. When ferrous metal is at the ignition temperature, the rate of oxidation is quite rapid. The ignition temperature is the temperature at which a cut in the metal or melting of the metal can be started with a stream of oxygen. When ferrous metal is at the ignition temperature it has color and is at a red heat at approximately 2500° F. Elements, other than iron, in the scrap metal may raise the ignition temperature to a white heat or substantially to the melting temperature.

Figure 2:
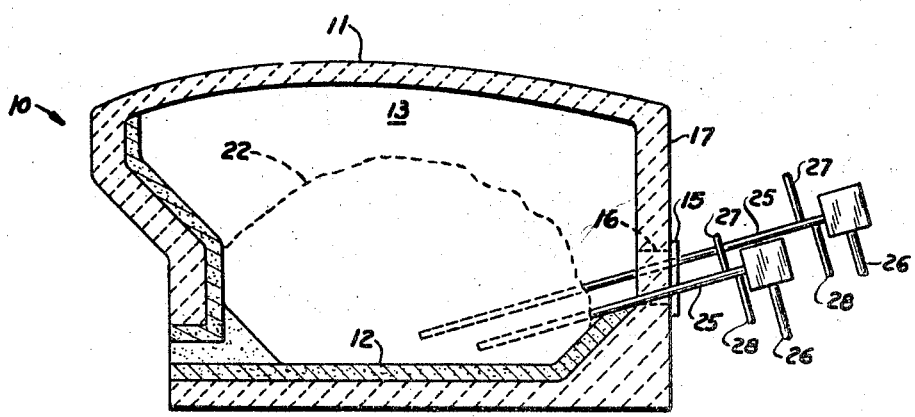

These and other objects and advantages of the present invention will become more readily apparent when considering the following description, taken with the accompanying drawing, in which:

Figure 1 is a fragmentary, longitudinal view, partially in section, of an open hearth furnace illustrating the principles of the present invention; and, Figure 2 is a sectional view taken along line 2—2 of Figure 1.

Referring to the drawing, open hearth furnace 10 includes a roof 11 and a hearth 12 defining a chamber 13. At one end of the furnace 10, there is a passage 14 communicating with the usual checkers (not shown). A passage (not shown) similar to passage 14 is at the opposite end of the furnace 10. A hot air blast is blown through passage 14 into the furnace and out the other passage. Periodically, the direction of blast flow is reversed as is customary in open hearth practice.

Charge openings 16 are provided in one of the furnace walls 17. A vertically movable door 15 is provided for each opening. The raw materials are charged through openings 16 into the furnace and onto the hearth. An elongated burner 18 extends through wall 9 of the furnace to direct heating flames into the chamber 13. The burner 18 may be connected to a source of fuel, such as gas or oil, through a pipe 19 and a source of air or oxygen-enriched air through pipe 20. Pipes 21 and 22 provide for the flow of cooling water through the burner. The burner 18 may be of any suitable type as may be the fuel and the burner may be supported in the most desirable position. Any number of burners may be used. The fuel and combustion-supporting gas are commingled by the burner so that the heating flames are directed from the burner into the furnace chamber 13. Combustion-supporting gas from passage 14 supplies the additional gas necessary to burn the fuel. If desirable, all of the combustion-supporting gas, such as air or oxygen-enriched air necessary to burn the fuel, may be provided by the hot blast entering through passage 14, but preferably, at least part of the combustion-supporting gas is mixed with the fuel by the burner.

In operation of the furnace, limestone is first charged into the furnace. Scrap metal, either cold scrap steel or iron, or both, is charged through openings 16 into the furnace in a pile as indicated at 22. The flames from burner 18 slowly heat and then melt the scrap metal during the first stage of the steel making operation. After the scrap is melted, molten pig iron may be added. During the second stage of the operation, heating is continued and the metal is refined to form steel having the desired analysis and characteristics. After the refining stage is complete, the molten, product steel is tapped from the furnace.

A period of a number of hours is required to heat and melt the pile of scrap 22. It takes a long time for the heat to soak through the pile to the interior. The use of oxygen-enriched air to burn the fuel injected into the furnace by burner 18 increases the temperature of the heating flames. While this increase in temperature effects some reduction in the period required for the heat to soak through to the interior of the scrap charge, the period remains quite lengthy. This in turn limits the number of heats than can be produced in the furnace for a given period of time and reduces the tons of steel per day produced by the furnace.

In accordance with the present invention, the period required to heat and then melt scrap metal charge in the furnace is reduced, which in turn reduces the time required to produce a heat in the furnace and increase the production of steel. Referring to the drawing, a plurality of pipes 25 extend through the wall 17 into the interior of the pile of scrap 22. Each pipe 25 is connected through a pipe 26 to a source of oxygen-rich gas. The oxygen-rich gas is predominantly oxygen and preferably contains at least 85% by weight of oxygen, although any oxygen-rich gas may be used that contains at least 50% or more by weight of oxygen. The pipes 25 may be provided with connections 27 and 28 for circulating cooling water through suitably located jackets to prevent overheating and deterioration or they may be plain steel or iron pipes. If the pipes 25 are not water cooled, the inner ends of the pipes will be slowly consumed, and the pipes should be relatively long so that they can be gradually pushed into the furnace as the inner ends are consumed so as to maintain the inner ends at the desired points in the interior of the pile of scrap.

Directing one and preferably a plurality of streams of oxygen-rich gas into the interior of the pile of scrap floods the interstices between the pieces of scrap metal with the oxygen-rich gas. Preferably, the pipes 25 are inserted into the pile of cold scrap metal as soon as convenient after the scrap has been placed in the furnace. Apparently the oxygen replaces the gaseous products of combustion in these interstices so that unburned fuel or incompletely burned gases penetrate into the pile of scrap and burn in these interstices to more rapidly heat the pieces of metal. The oxygen also burns any combustible material on the scrap. During the first portion of the heating period while the cold scrap metal is being heated there is no substantial oxidation of the metal. When all or portions of the scrap metal located in the interior of the pile, that is metal located inside of the outer surface of the pile, has been heated to the ignition temperature, oxidation will occur and this exothermic reaction will aid in reducing the second or final portion of the heating and melting period. As the scrap metal starts to melt, the oxygen in the interstices will unite with the molten scrap metal trickling down through the pile of scrap metal. The uniting of the oxygen with a combustible gas in the interstices and with metal generates heat within the voids and reduces the heating period by reducing the amount of heat which must soak through the pile of metal from the outer surface. Reducing the period required to heat and melt the scrap increases the amount of steel produced per furnace per day. This in turn reduces the amount of investment required per ton of steel produced so as to decrease the cost of the steel and increase the production of steel. The oxidation of the scrap metal will cause some increase in the amount of iron oxide present when the scrap metal is melted and this iron oxide will react with constituents in the hot metal which is subsequently added. In accordance with the present invention, oxygen-rich gas is directed into the pile of scrap while the pieces of scrap metal are solid and before the metal is at the ignition temperature and preferably while the metal is cold and before the scrap metal has been heated substantially by the heating flames.

The number of points at which oxygen-rich gas is directed into the interior of the pile of scrap metal will depend upon the size of the pile of scrap metal and to a certain extent upon the character of the scrap metal. If the pieces of scrap metal are relatively small, it may at times be desirable to direct oxygen-containing gas into the pile at a greater number of points than when the scrap metal is relatively coarse. If the pile of scrap metal is not too large, the oxygen-rich gas can be injected at one point instead of a plurality of points.

I claim:

1. In the method of making steel in an open hearth furnace, the steps comprising, placing a charge of pieces of scrap metal in a pile in such a furnace, directing heating flames into the furnace first to heat the scrap metal to the ignition temperature and then to heat and melt the scrap metal, and discharging oxygen rich gas that is predominately oxygen into the pile of scrap metal at a point inside of the pile of scrap metal while the scrap metal is at a temperature below the ignition temperature to flood the interstices between the pieces of solid scrap metal with the oxygen rich gas to aid the heating flames in heating the interior portion of the pile of scrap metal.

2. In the method of making steel in an open hearth furnace the steps comprising, placing a charge of pieces of scrap metal in a pile in such a furnace, directing heating flames into the furnace first to heat the scrap metal up to the ignition temperature and then to heat and melt the scrap metal, and discharging oxygen rich gas that is predominately oxygen into the pile of scrap metal at a point inside of the scrap metal while the metal inside the exterior surface of the pile of scrap metal is below the ignition temperature to flood the interstices between the pieces of solid scrap metal with the oxygen rich gas to aid the heating flames in heating the metal in the interior of the pile of scrap metal without effecting substantial oxidation of the scrap metal.

3. In the method of making steel in an open hearth furnace, the steps comprising, placing a charge of pieces of scrap metal in a pile in such a furnace, directing heating flames into the furnace first to heat the scrap metal to the ignition temperature and then to heat and melt the scrap metal, and discharging an oxygen rich gas containing at least 85% oxygen into the pile of scrap metal at a point inside of the pile of scrap, while the scrap metal inside the exterior surface of the pile of scrap metal is at a temperature below the ignition temperature to flood the interstices between the pieces of solid scrap metal with the oxygen rich gas to aid the heating flames to heat the scrap metal.

4. In the method of making steel in an open hearth furnace, the steps comprising, placing a charge of pieces of scrap metal in a pile in such a furnace, directing heating flames into the furnace first to heat the scrap metal to the ignition temperature and then to heat and melt the scrap metal, and discharging oxygen rich gas that is predominately oxygen into the pile of scrap metal at a plurality of points inside of the pile of scrap metal while the scrap metal is at a temperature below the ignition temperature to flood the interstices between the pieces of solid scrap metal with the oxygen rich gas to aid the heating flames in heating the interior portion of the pile of scrap metal.

5. In the method of making steel in an open hearth furnace, the steps comprising, placing a charge of pieces of scrap metal in a pile in such a furnace, directing heating flames into the furnace first to heat the scrap metal to the ignition temperature and then to heat and melt the scrap metal, and discharging oxygen rich gas that is predominately oxygen into the pile of scrap metal at a plurality of points inside of the pile of scrap metal while the metal inside the exterior surface of the pile of scrap is below the ignition temperature to flood the interstices between the pieces of solid scrap metal with the oxygen rich gas to aid the heating flames in heating the metal in the interior of the pile of scrap metal without effecting substantial oxidation of the scrap metal.

6. In the method of making steel in an open hearth furnace, the steps comprising, placing a charge of pieces of scrap metal in a pile in such a furnace, directing heating flames in the furnace first to heat the scrap metal to the ignition temperature and then to heat and melt the scrap metal, and discharging an oxygen rich gas containing at least 85% oxygen into the pile at a plurality of points inside of the pile while the scrap metal inside the exterior surface of the pile of scrap metal is at a temperature below the ignition temperature to flood the interstices between the pieces of solid scrap metal with the oxygen rich gas to aid the heating flames to heat the scrap metal.

WALTER W. KOMPART.

References Cited in the file of this patent

UNITED STATES PATENTS

| Number | Name | Date |
|---|---|---|
| 1,252,443 | Humbert | Jan. 8, 1918 |

FOREIGN PATENTS

| Number | Country | Date |
|---|---|---|
| 873,301 | France | July 6, 1942 |

OTHER REFERENCES

Steel, June 23, 1947, pages 106 to 108 and 144. Published by the Penton Publishing Co., Cleveland, Ohio.

The Foundry, October 1947, pages 74 to 77, 221 to 224, and 226. Published by the Penton Publishing Company, Cleveland, Ohio.